United States Patent [19]
Krause

[11] 4,317,496
[45] Mar. 2, 1982

[54] IN-MOTION WEIGHING SYSTEM
[75] Inventor: Kenneth E. Krause, Sheridan, Wyo.
[73] Assignee: Exxon Production Research Company, Houston, Tex.
[21] Appl. No.: 59,713
[22] Filed: Jul. 23, 1979
[51] Int. Cl.³ .................... G01G 21/22; G01G 13/14
[52] U.S. Cl. ................................. 177/163; 177/165; 177/DIG. 6
[58] Field of Search ................. 177/163, 165, DIG. 6

[56] References Cited
U.S. PATENT DOCUMENTS

| | | | |
|---|---|---|---|
| 3,276,525 | 10/1966 | Cass | 177/163 X |
| 3,446,298 | 5/1967 | Cory et al. | 177/163 X |
| 3,545,555 | 12/1970 | Cass | 177/163 X |
| 3,646,328 | 2/1972 | Tonies et al. | 177/163 X |
| 3,721,820 | 3/1973 | Caulier et al. | 177/163 X |
| 4,094,367 | 12/1978 | Jones et al. | 177/163 X |
| 4,134,464 | 1/1979 | Johnson et al. | 177/163 X |

FOREIGN PATENT DOCUMENTS 575499  11/1977  U.S.S.R. ................. 177/163

Primary Examiner—George H. Miller, Jr.
Attorney, Agent, or Firm—David A. Roth

[57] ABSTRACT

A dynamic weighing system for vehicles in motion which is specially adapted for weighing a plurality of coupled railroad cars of varying length randomly interspersed in a continuous coupled train. The system is adapted to automatically weigh and record each individual car in the train without the necessity of special grade slopes, special decoupling devices, mechanical switches, special positioning measurements, special axle measurements and counting and systems to screen out unwanted noises from irregular car movement. The inventive system in a preferred embodiment will not register locomotives and cabooses. The preferred system utilizes preselected photocell sensor units in an arrangement keyed to the cross section bulk of each car. The shape of the cars interrupts photocell signals at predetermined points on a weigh bridge, thereby actuating means at the precise point when each car is at the optimum weighing position on a scale.

17 Claims, 5 Drawing Figures

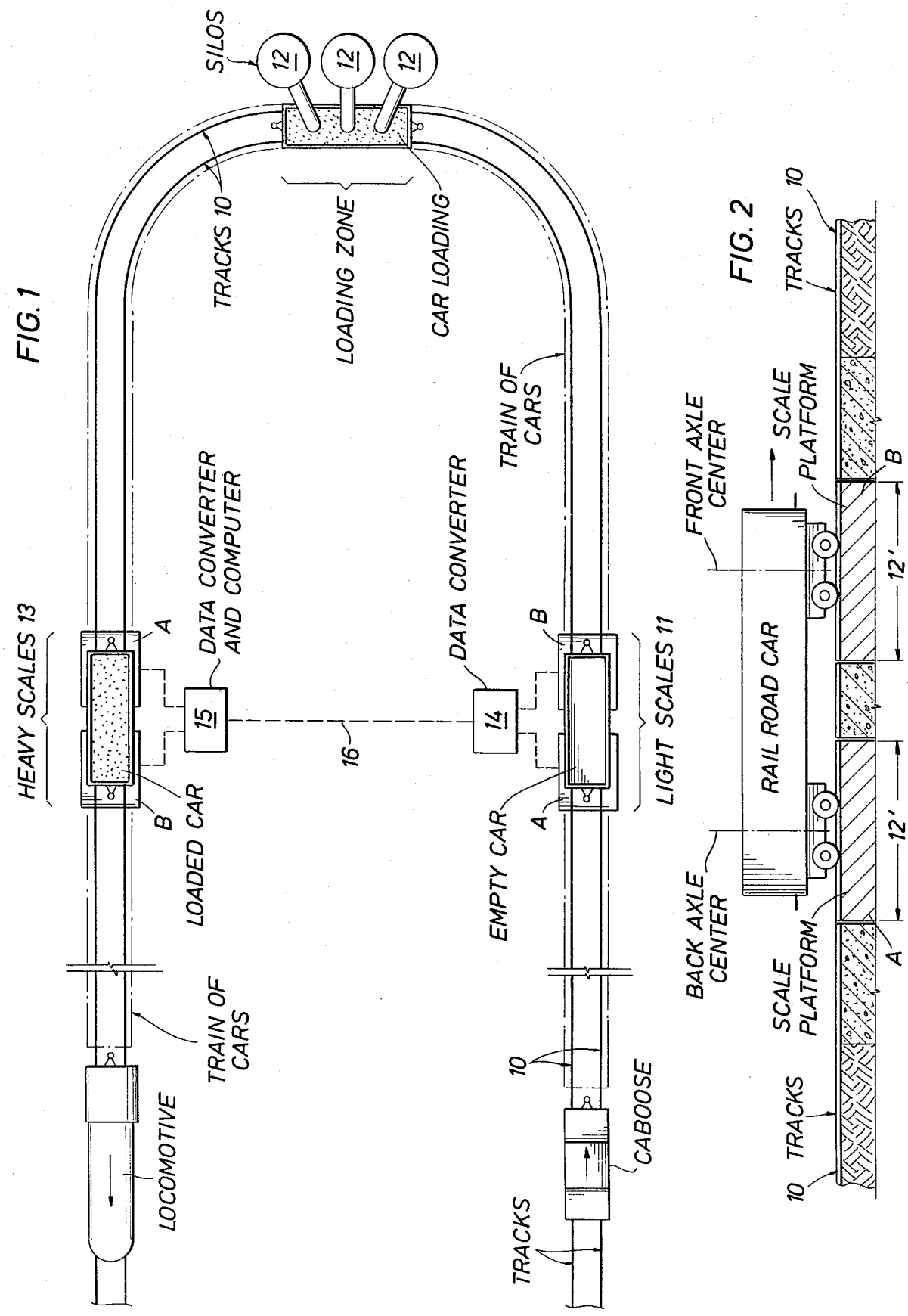

IN-MOTION WEIGHING SYSTEM

BACKGROUND OF THE INVENTION

1. Field of the Invention

This invention relates to the process, apparatus and system for weighing moving objects preferably individual freight cars of different dimensions in a train comprising a plurality of such freight cars.

2. Background of Prior Art

The weighing of moving loads such as railway rolling stock, particularly freight cars, locomotives and trucks is a well-established technology. U.S. Pat. No. 2,543,794 entitled, "Track Scale" issued on Mar. 6, 1951 on an application filed Nov. 19, 1945 carries an excellent and detailed historical description of the technology and objectives of this art. As early as that date, it was known to use heavy duty track scales to weigh cars in motion utilizing a weight scale beam coupled with automatic weight recording devices capable of automatically printing out the weight on the weight tickets.

At that time and continuing up to the present time a key technique of delineating the length of the particular car or truck was based on the spacing of the car axles supporting the truck. The presence of a car axle was determined by various trips or trip mechanisms, such as mechanical switches and photo electric devices and other "position-responsive devices".

Early in the development of the art it was recognized that the force exerted by adjacent cars in a moving train would adversely effect the accuracy of the weight. Therefore slopes were built into both the approaches and exits of track scales and various mechanical coupling systems were devised to facilitate decoupling at critical juncture in the ascertainment of weight. U.S. Pat. Nos. 3,093,200; 3,172,490; and 3,367,432 are illustrative of this tact taken by the art and which need but not be employed by Applicant, since his technique overcomes this effect without the necessity for decoupling.

Ancillary to the problem of weighing the railroad cars, has been the problem of identifying the cars. Therefore, one facet of the art employs certain codes on the railroad cars in conjunction with a scanner system, which can identify the car and couple each car's identification with its registered weight. The scanning system technology is illustrated by U.S. Pat. Nos. 3,106,706 and 3,393,757 and plays no part in Applicant's invention, although it can be used as a useful adjunct to the system of Applicant's invention.

The art has also been concerned about the design of weigh bridges. In general, these are steel platforms in which tracks are mounted so that cars can pass over them wthout any interruption. They are installed with strain gauges, a form of transducer which generates an electrical signal directly proportional to the weight of the load. Examples of weigh bridge designs are U.S. Pat. Nos. 3,421,593 and 4,061,198.

From an early stage in the development of the art, great efforts have been made to develop systems in which accurate weighings could be obtained without stopping each individual car for weighing. Thus, the concept and goal of in-motion weighing was a desideratum of the industry. These are sometimes referred to as dynamic weighing systems.

They generally followed two main streams of development. One of these is in which switches were used, usually mechanical switches in which the wheels of the vehicle would actuate various electronic circuits. Various logic systems were employed to detect and count axles, subtract and add various weight combinations which are generated by the axles, etc. U.S. patents illustrative of this approach include U.S. Pat. Nos. 3,605,801; 3,403,740; 3,192,535; 3,556,236; 3,646,327; 3,646,328 4,134,464; and 3,374,844.

Another variant was the dynamic system in which no switches were employed and the technique was to utilize a plurality of transducers to detect the weight spaced along the length of the weigh scale so that the transducers would produce a continuously varying signal as a load passed over them. Examples of patents covering this technology are: U.S. Pat. Nos. 3,674,097; 3,063,633; 3,276,525; 3,439,524; 3,446,298; 3,406,771; 3,101,800; and 4,094,367.

Miscellaneous other relevant techniques are described in U.S. Pat. No. 3,512,004 which utilizes radiation positioning to control the movement of cars to a predetermined position. U.S. Pat. No. 3,842,922, which totalizes all individual axle weights on a given scale, U.S. Pat. No. 3,721,820 uses heat sensors to detect hot boxes. U.S. Pat. No. 3,750,158 teaches a fairly straightforward technique of a photo sensor to determine when a person has entered a room with a scale in it and a photo sensor, to close the door behind, forces that person to stay in the room long enough to have his or her weight recorded and then determine whether or not that person's weight has changed from the time the room has been entered. The objective in this patent is to ascertain whether or not the person has picked up any object in the room. Thus, it is a security device and is not related at all to the problem of weighing railroad cars in motion.

SUMMARY OF THE INVENTION

A weighing means, e.g. weigh scale platform in cooperation with position sensing means determines optimum scale positions for each car of a variety of preselected lengths, whereby signals generated by sensing devices in the weighing weight scale proportional to weight reflect only the true weight of the object being loaded and reject extraneous signals due to other factors.

In a specific embodiment photo electric cells suspended above a weigh scale detect the location of freight cars of varying length when signals or when radiation from the photocells are interrupted by the body of the freight car. These signals are converted into digital pulses which in turn are programmed by a logic circuit, which calculates the point at which these pulses correspond to the actual weight of the moving load of the freight car passing over the weighing platform.

BRIEF DESCRIPTION OF THE DRAWINGS

FIG. 1 is a schematic showing a circular section of railroad track which passes over a light scale through silos and then over a heavy scale to weigh moving cars after being loaded.

FIG. 2 shows the specific embodiment of the invention in which two platforms are utilized and provision is made so that the front set of wheels must be on one platform and the back set of wheels on another platform to have accurate weighing.

DESCRIPTION OF THE PREFERRED EMBODIMENTS

Figure 3:
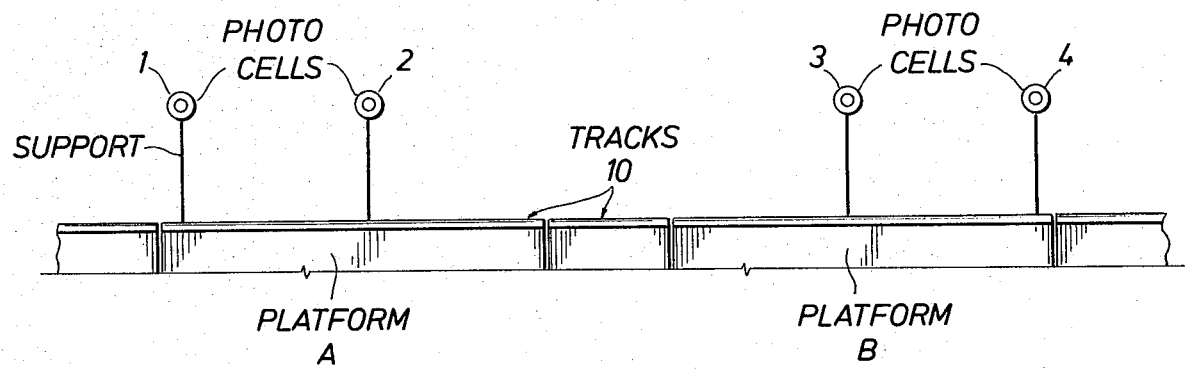
FIG. 3 is a schematic side view showing the approximate location of photocells on two platforms to detect the location and presence of a particular car of a particular length.

It has been discovered and forms the essential characteristics of this invention that:

Units having cargo-carrying bodies supported by wheeled axle configurations can be effectively weighed in motion by a unique dynamic weighing system especially adapted for vehicles in motion. The invention apparatus and system is especially suitable for weighing a plurality of coupled railroad cars of varying length randomly interspersed in a continuous coupled train of such cars. The system is adapted to automatically weigh and record each individual car in the train without the necessity of special grade slopes, special decoupling devices, mechanical switches, special mechanical positioning measurements, special axle measurements and counting and systems to screen out unwanted noises from irregular car movement. A key aspect of the invention is the use of position-responsive devices which sense the position of the cargo body with relationship to the transducers on the scale and generate appropriate electric signals which specifically control the selection of an electric value which can be transmitted to final weight. The inventive system in a preferred embodiment will not register locomotives and cabooses. The preferred system utilizes preselected photocell sensor units in an arrangement keyed to the cross-section of each car cargo body. The shape of the cars interrupts photocell signals at predetermined points on a weigh bridge, thereby actuating electronic trigger means at the precise point when each car is at the optimum weighing position on a scale.

At the same time, varying signals from the transducers, preferably strain gauges, in the scales are being continuously generated. The two separate sets of signals are integrated in a logic circuit to result in one selected signal which is accurately representative of true weight. This signal is converted to a weight number which is registered by display and/or printout mechanising.

In the preferred embodiment of the invention illustrated by FIG. 1, a train enters on track 10 which is in a circular configuration of approximately ¾ to 1 mile, passes over the first scale 11 which is referred to as the light scale since it is weighing empty cars and proceeds to be loaded from silo 12. After loading, the train passes over scale 13 which is referred to as the heavy scale since it weighs loaded freight cars.

These scales can be any conventional weigh bridge design with strain guage load cell assemblies which are described in U.S. Pat. No. 3,421,593 and other well-known literature. In the preferred embodiment each scale comprises two separate weigh bridge platforms of about twelve feet in length and are arranged whereby the front axles and the back axles of each car are on approximately the center of the platforms where the actual weight is recorded.

Each scale is provided with one or more transducers in appropriate locations responsive to weight changes.

These are normally strain guage load cells which produce a signal which is proportional to the weight exposed.

These transducers and associated electronics are well known in the art. In essence, the signals from the transducers are received by a data converter means 14 at the light scale 11 and 15 at the heavy scale 13. The data converter at the light scale is connected by means of electronic cable 16, so that the data for a particular car on the light scale can be transmitted via cable 16 to the computer at the heavy scale which will be used for calculations.

FIG. 2 is a schematic illustrating a position of a typical railroad car on the two platforms making up a weigh scale of the invention. In this specific embodiment of the invention, each steel weight platform is twelve feet in length. These platforms are described in a variety of prior art publications including patents discussed in the Background of the Invention section above. The exact choice of platform sizes and relative locations will be an apparent choice to one skilled in the art. Usually, the platforms are integral with the main portion of track 10 by means of a set of tracks contained in each platform per se, which set of tracks connects with track 10 to provide a continual track permitting a train to pass without interrupting its motion over the scales.

It is important for the purposes of this specific embodiment of invention that the rear wheels be on a back platform and the front wheels be in the front platform at the time the car weight is taken. Thus, the front wheels and back wheels are simultaneously on their respective platforms.

In the specifically preferred embodiment of the invention, which is also used commercially, each platform is 12 feet long. Railroad cars can have either a single set of axles on each end or multiple axles on each end. It is immaterial how many axles are on each car as long as the entire front end is on the front end platform scale and the entire back end is on the back end platform scale at the transducer locations at the exact time that weight is being recorded.

This is a notable departure from prior art weighing techniques which use the technique of detecting axles as they pass over predetermined spots by means of either photo electronic radiation-sensitive position sensing means or mechanical switches.

In the specific embodiment of the invention, each platform is provided with four load cells in a generally central location under the platform. Of course, depending on the particular circumstances the number and location of load cells can be varied considerably. Load cells are trnsducers which produce electric signals proportional to weight and are composed of strain gauges. They are standard items of equipment easily available from numerous manufacturers. Specifications for these cells are set depending on the weight loads which the user anticipates he will encounter.

As is well known, the load cells operate by converting a weight or pressure impulse into a direct electrical analog signal which is proportional to the weight sensed by the individual cell or a battery of cells. Thus, it is clear that on any platform as the car passes over, a series of very different electrical signals will be continuously generated from a given platform. The intensity of these signals will be a function of the particular weight/time relationship that the cell is exposed to. This will vary as the moving vehicle approaches and departs from its maximum signal generation point on the platform. (In the preferred embodiment of this invention, these moving vehicles are railroad cars and most specifically railroad cars adapted to carry coal.)

It is known in the prior art that these varying signals are generated and it is known that the problem is how to select only those few signals which represent the actual weight of the passing vehicle to be weighed. One wants to reject the many extraneous signals which are not representative of actual weight. One approach for doing this, known to the art, is to utilize a plurality of mechanical switches which are actuated by the wheels of the car as they pass by. Each switch is connected into an electrical circuit controlling its own individual logic system.

In actual experience it occurs that many such switches must be used. And usually, the number of such switches is too great for the simple logic system available. Moreover, the switches are not reliable and tend to either break or to be inoperable at critical junctures because of weather and climatic conditions.

To overcome the manifold disadvantages of the prior art, the present invention utilizes a novel and unique cooperative interrelationship between specific locating devices, specific electronic signals and specific logic circuits. This cooperative relationship results in a synergistic effect which overcomes substantially all of the disadvantages of the prior art and permits measurements to be made in a simple effective manner.

One aspect of the conceptualization of the invention was the realization that counting wheels and axles by sensing the actual presence or movement of the wheels is a difficult and unnecessary pursuit. A much more useful approach is to sense the location of a particular vehicle by virtue of the shape of the body, e.g. cargo carrying portion of the vehicle or the car itself. Thus, the body of the vehicle per se can be used as a means whereby signals representative of the preselected location of wheels on the scales can be detected and utilized as a triggering mechanism for segregating values representative of actual weight, which values are continuously emanating from another source.

Figure 4:
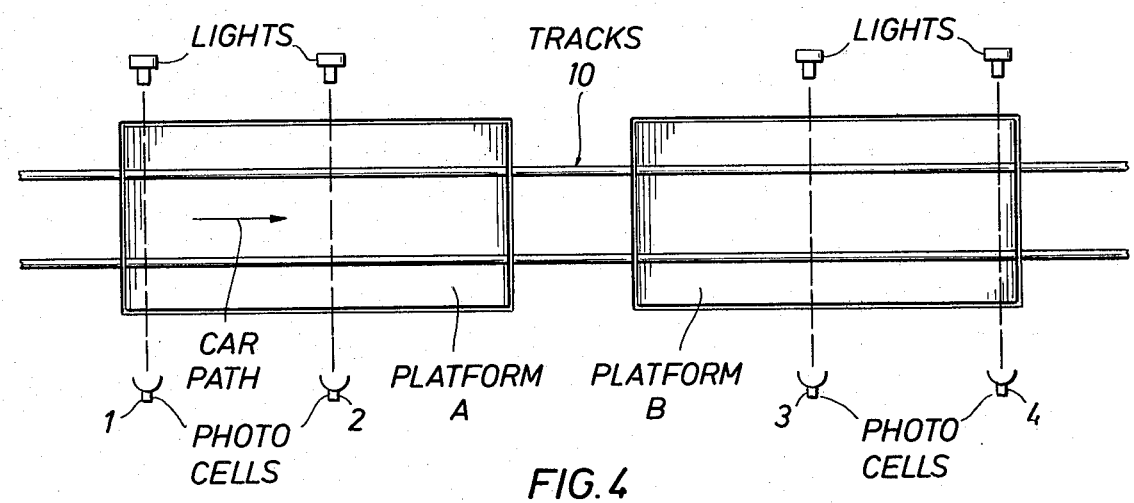
FIG. 4 is a schematic top view of the FIG. 3 configuration.
Figure 5:
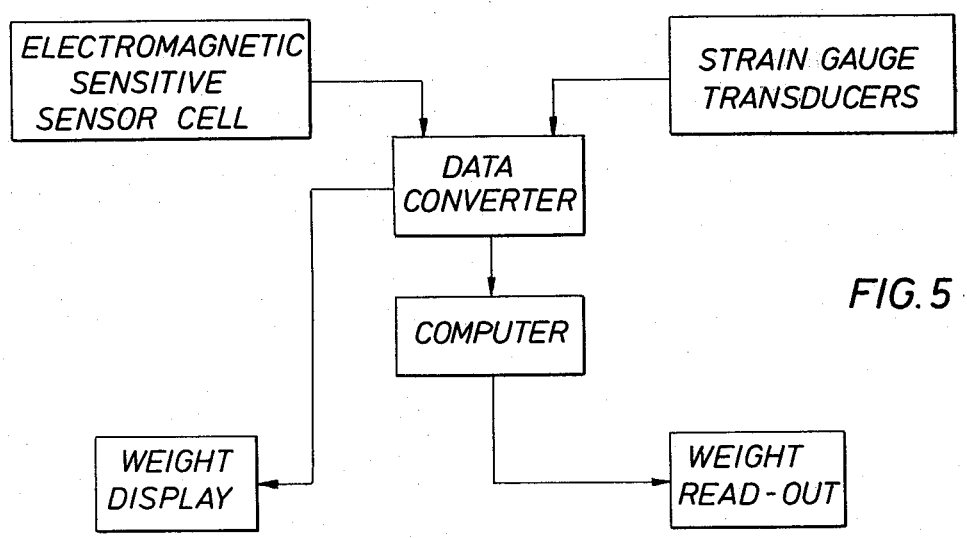
FIG. 5 is a schematic of a circuit illustrating a preferred embodiment of the invention.

A preferred embodiment is shown in FIGS. 3, 4 and 5. In FIG. 3 there is a side view of the photocells units (e.g. a light source and a light sensitive cell) which are arranged in a special preselected configuration with specific distances and intervals. The same arrangement of photocells with the light originating source is shown in FIG. 4, which is a top schematic of track 10 passing under the photocell configurations. Although photocells are shown in the schematic of FIGS. 3 and 4 and are a preferred embodiment of the invention, it is to be understood that any positioning means relying upon radiation or mechanical devices which sense and transmit signals reflecting the position of the cargo body of units to be weighed are within the purview of the invention.

In the specific embodiments of FIGS. 3 and 4 photocells 1 and 2 are located at a preselected position dependent on the weight of the vehicle to be weighed at the start of platform A and photocell No. 2 is located to the right of center of platform A. On platform B photocell 3 is located at the same overhead distance slightly to the left of the center of platform B and the fourth photocell is located at the far right of platform B. It will be noted that for the purposes of the specific preferred embodiment, each platform is approximately 12 ft. in length. It will be understood that suitable modifications and platform length and shape can be made to suit the particular conditions. Of course, the exact photocell spacing and locations are determined by the length of the particular type of unit passing over the platform.

For this specific illustration, it has been determined that the typical engine of a cargo train which is designed to carry coal from the mine mouth will, as it passes over the platform, block out all four of the photocells or block out three of the photocells at any given point in time.

Following the same analysis, it has also been determined that a typical 100-ton coal car will block out at any given point in time the two photocells on one platform, or the two photocells on the other platform or the two middle photocells. It will not block out all three photocells or all four photocells.

Thus, utilizing this logic, signals can be generated which permit the ready distinguishing between units of different lengths such as locomotives, cabooses and cargo cars of varying length.

It is to be understood that in the cooperative relationship of signals generated by the process and apparatus of this invention, one will recognize two main sets of electronic signals. One of these is those emanating from electronic signals generated by the photocells. The other is a set of electronic signals generated from the load cells as the object to be weighed passes over the platforms of the weigh scales.

Turning now to the set of varying signals being sent from the load cells as the moving objects pass over, one key feature or a component of the preferred aspect of the invention is that the analog electrical signal from the load cells are converted to a series of digital pulses. The technique of converting analog signals to digital signals is well known in the art and described in numerous literature sources. For the particularly preferred embodiment illustrated by the drawings, digital pulses are generated at the rate of 22 per second. The number of pulses per second is not a critical factor and they can vary depending on the equipment chosen and the particular circumstances surrounding the actual measurement. It is desirable that there be a relatively high number of pulses per unit of time, since this tends to make the measurements more accurate.

At this point we have described the generation of pulses proportional to the weight in any given point in time and we have described the generation of electrical signals dependent upon the locational factors and the length of a particular unit which is passing over the platforms. The problem at this point is how do we best register and note only those signals which represent the problem when a car to be weighed, (not a locomotive and not a caboose) is in the precise proper position on the platform. And, also how do we compensate for signals which are generated when cars inadvertently are backed up or are interrupted in some manner in their regular progression over the tracks.

The technique of the invention is to recognize and actualize a new cooperative relationship between the two sets of signals being generated simultaneously. As was described, one set of signals is preferably a constant 22 pulses per second which is always a digital representation of analog signals which are proportional to weight. Simultaneously, signals being generated by the photo electric cells indicate whether they see or don't see a particular unit in the moving train.

These separate sets of signals are coordinated and corelated in a computerized circuit by means of a simple algorithm.

Once the need for the particular relationship is established, the design of the alogrithm is well within the skill of those familiar with the computer art. In the particular algorithm for the invention, only those digital impulses which occur when the middle photocells are blocked off by the passage of the railroad car are used as a basis for weight recording. Thus, the pulsating weight signal is generated only at the precise time that the back wheels of a car are on platform A and the front wheels of the car are on platform B.

The next key cooperative interacting feature of this invention is that the algorithm is designed so that it measures tolerance differences between signal levels. Thus, the key is to isolate just a few pulse signals, e.g. 4, 5 which do not vary from each other more than some special preselected tolerance limit. Then, where these 4 or 5 out of 22 per second signals are isolated, because they are measured as being relatively close to each other in amplitude, then such signals are found to be representative of the point at which time both of the front set of wheels and the back set of wheels are at dead center with respect to the load cells on platforms A and B, while the cars are in motion.

Although it is not essential, it is preferred in this particular embodiment that the weight on the front platform is independently determined and the weight on the back platform is also independently determined. The two platform weights are then totalized in order to obtain the overall weight of the cars.

This process, as described above, is carried out for both empty cars and full cars and the computer can easily calculate net difference for each car.

It is also manifest that the computer is programmed to recognize the various patterns generated by the photo electric cells and can either ignore these signals when they represent the backward movement of the train or other irregular movement of the train and therefore will utilize signals only when they represent the key dead center weight point as described above.

Although the invention has been described specifically in terms of light sets of scales and heavy sets of scales and two sets of platforms, etc., it would be entirely possible by suitable modification to utilize a single set of scales which are located directly under the feed hoppers. Thus, the weight platform with an empty freight car standing on it would generate signals representing an empty car. As it stands in place being loaded, the signals would be constantly changing until a car was fully loaded. And then the car would be removed from the platform to be replaced by an empty car. The weight changes and car movements could be recorded and accommodated by the existing system with only minor modifications.

Nevertheless, the system is expressly designed for a dynamic movement system and it might be over engineering to use this system for static weighing as in the platform system described above.

As has been explained by the above description, FIG. 5 represents a separate set of electronic signals emanating from the strain gauge transducers representative of the weight of the objects being measured and electronic signals from the sensor cells representative of location of the objects being measured.

These separate sets of electronic signals are conveyed to a computer which is programmed to calculate and register weights only at junctures controlled by the signals from the sensor cells.

The weights thus obtained from computer output are transposed into hard copy as a computer readout.

We claim:

1. A weighing apparatus comprising a system especially adapted for weighing dynamic loads, said system comprising in combination:
   (a) weighing means responsive to units having cargo-carrying body means with wheeled multi-axle means to be weighed while in motion comprising:
      (i) platform means and
      (ii) weight-responsive, electrical-signal-producing transducer means cooperative with said platform means, whereby in a single time period, electric signals directly proportional to the actual weight of any of said units are generated only at one preselected position on each of said platform means and whereby other extraneous electric signals not representative of actual unit weight are continuously produced as each of said units traverses said platform means;
   (b) position sensing means responsive only to said body means and adapted and constructed to generate an electrical signal under conditions whereby:
      (i) only wheel means of units of predetermined cargo body length are on said platform means and
      (ii) are directly over or near said transducer means and
      (iii) whereby said position signal emanates at or shortly before said actual weight signal from said transducer means;
   (c) Calculating means responsive to both said transducer signals and position signals to intergrate said signals whereby said position signal regulates transducer signals thereby to generate a final signal that represents only the actual weight of any of said units.

2. An apparatus according to claim 1, wherein said position sensing means are devices which sense radiant energy and are mounted above said platform and are interrupted by said cargo carrying body.

3. An apparatus according to claim 1 wherein additional digitizing means are provided for converting said transducer signals into discrete electrical pulses for said calculating means.

4. An apparatus according to claim 1 which has the sensing means of claim 2 and a digitizing means of claim 3.

5. The apparatus of claim 2 whereby the said radiant energy sensing means is photo electrical cell unit.

6. A method of weighing cargo carrying body means with wheeled multi-axle means units in motion which comprises the steps in combination of:
   (a) passing said units over the weighing apparatus of claim 1
   (b) generating a series of electric signals representing both the approximate weight of said unit and true weight of said unit
   (c) identifying those signals having maximum value as representative of the true weight of said unit utilizing the calculating means of claim 1.

7. The process of claim 6 whereby said weight signals are electric signals which are converted to digital pulses.

8. The method of claim 6 wherein at least one front axle means is on a weighing device and at least one rear axle means is on a weighing device at the time when the said true weight of said unit is determined.

9. The method according to claim 8 wherein said cargo-carrying means are railroad cars.

10. A method according to claim 9 wherein said railroad cars are of varying body lengths.

11. In a weighing apparatus comprising a system especially adapted to weighing a multiplicity of moving loads on a cargo carrying body means having wheeled multi-axle means which system comprises a track portion, a light scale integral with said track portion, loading means located after said light scale and heavy scales integral with said track portion located after said loading portion, wherein said light scales and said heavy scales are in electrical communication with each other and wherein both said light scales and said heavy scales consist of two weigh platforms each, each of said weigh platforms having at least two weigh responsive electrical signal producing transducer means the improvement which comprises in combination:

(a) Multiple radiation responsive position sensing means, having electrical signal generating capability, located on horizontal support means positioned at the beginning of the initial portion of each of the first weigh platform and the middle position of said first platform and at the middle position of said second platform and at the end position of said second platform of each weigh platform, and so arranged and constructed that the passage of only the body portion of a wheeled, cargo-carrying body will interrupt a radiation signal insensitive to said wheeled portion of said body transmitted to said sensing means as said body passes by, thereby generating a positioning signal and whereby each set of radiation means is preselected and prelocated in a configuration whereby the cargo units to be weighed can never block out more than two of any combination of sensing means and whereas larger pieces of attendant equipment may block out three or four of said sensing means and smaller pieces of attendant equipment may block out one sensing means but only the unit to be weighed will block out two of said electrical sensing means simultaneously;

(b) Calculating means responsive to both said transducer signals and position sensing to integrate said multiplicity of signals whereby said positioning signal regulates transducer signals to generate a final signal that represents only actual weight of any of said units.

12. The apparatus of claim 11 whereby said position sensing means are photo electric cell means.

13. The apparatus of claim 11 whereby said transducer means signals are digitized before transmittal to said calculating means.

14. The apparatus of claim 11 wherein said calculating means is a logic circuit controlled by an appropriate algorithm.

15. The apparatus of claims 11, 12, 13 and 14.

16. The apparatus of claim 11 whereby said cargo units are coupled railroad cars.

17. The apparatus of claim 16 wherein said railroad cars are of varying body lengths.

* * * * *